(12) United States Patent
Fujinaka

(10) Patent No.: US 6,832,853 B2
(45) Date of Patent: Dec. 21, 2004

(54) BEARING DEVICE AND MOTOR WITH THE BEARING DEVICE

(75) Inventor: Hiroyasu Fujinaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 57 days.

(21) Appl. No.: 10/296,376

(22) PCT Filed: Jul. 23, 2001

(86) PCT No.: PCT/JP01/06342

§ 371 (c)(1),
(2), (4) Date: Jan. 23, 2003

(87) PCT Pub. No.: WO02/10602

PCT Pub. Date: Feb. 7, 2002

(65) Prior Publication Data

US 2003/0113045 A1 Jun. 19, 2003

(30) Foreign Application Priority Data

Sep. 27, 2000 (JP) .................. 2000-226572

(51) Int. Cl.[7] .............................................. F16C 33/10
(52) U.S. Cl. ..................................... 384/100; 384/279
(58) Field of Search ............................ 384/100, 107, 384/114, 279, 902

(56) References Cited

U.S. PATENT DOCUMENTS

| 4,737,673 | A | | 4/1988 | Wrobel |
| 6,082,903 | A | | 7/2000 | Saneshige |
| 6,517,247 | B2 | * | 2/2003 | Cheng .................. 384/279 |
| 2002/0102039 | A1 | * | 8/2002 | Horng .................. 384/279 |

FOREIGN PATENT DOCUMENTS

| JP | 56-109920 | 8/1981 |
| JP | 5-54563 | 8/1993 |
| JP | 7-213009 | 8/1995 |
| JP | 10-196656 | 7/1998 |
| JP | 2903664 | 6/1999 |

* cited by examiner

Primary Examiner—Thomas R. Hannon
(74) Attorney, Agent, or Firm—Wenderoth, Lind & Ponack, L.L.P.

(57) ABSTRACT

A bearing device includes an oil impregnated sintered bearing that rotatably holds a shaft fixed to a rotor, and a bearing boss having an inner wall to which the bearing is fixed. An end of the boss is sealed with a cap. Plural grooves are formed on the inner wall of the cap, so that lubricant leaked out from the bearing can be retained therein and restored to the bearing. This structure extends the service life of the bearing.

14 Claims, 11 Drawing Sheets

FIG. 12 - PRIOR ART
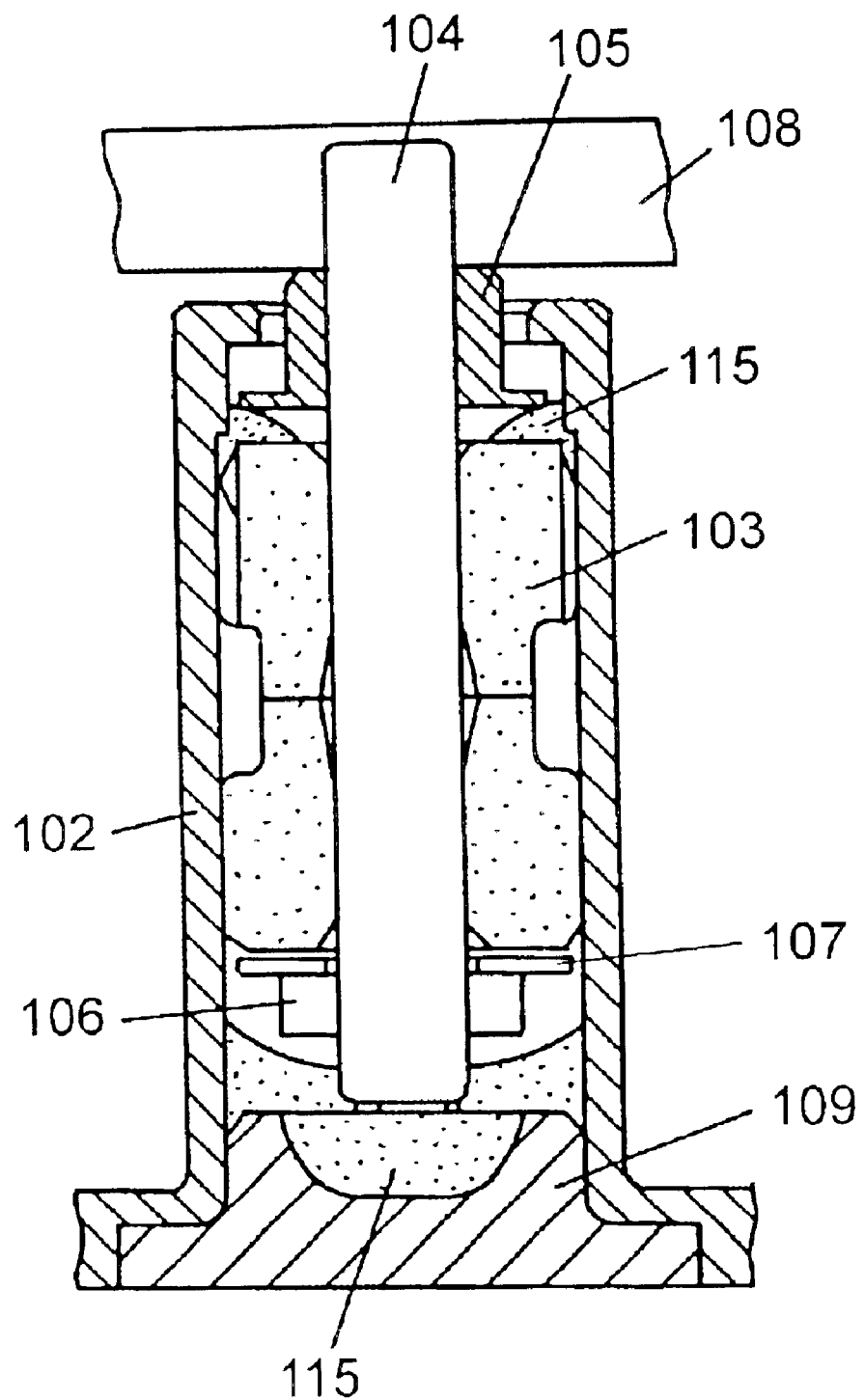

BEARING DEVICE AND MOTOR WITH THE BEARING DEVICE

TECHNICAL FIELD

The present invention relates generally to miniature motors and bearing devices thereof, more particularly, to bearing devices suitable for motors employed in office automation (OA) apparatuses such as personal computers, work stations and laser-beam printers, or audio-video (AV) apparatuses such as Digital Versatile Disc (DVD) apparatuses and Video Cassette Recorders (VCR).

BACKGROUND ART

OA apparatuses and AV apparatuses use plural motors per apparatus as their driving sources. Those motors mainly use oil impregnated sintered bearings because of inexpensive cost and easy handling.

Those motors employed in OA apparatuses and AV apparatuses have frequently spun at higher speeds than conventional motors due to recent speeding up and sophistication of the apparatuses. For instance, a spindle motor for driving a disc of a CD-ROM device mounted in a personal computer is required to spin as fast as 10,000 rpm although a conventional motor spins at several hundred rpm.

The speeding up and sophistication of the foregoing apparatuses remarkably increase information volume processed in electronic circuits of the apparatuses, and the electronic circuits thus generate greater heat amount. A blower, using a fan driven by a motor, for cooling the heat amount draws attention from the market, and a fan motor is also required to spin faster.

In general, those OA and AV apparatuses are used on a maintenance-free basis, and the service life of those apparatuses often depends on the life of bearings of the motors used in the apparatuses. A longer life has been demanded of the bearings in order to extend the service life of the apparatuses.

A conventional bearing disclosed in Japanese Patent Gazette No. 2903664 has been well known. FIG. 12 shows a structure of the conventional bearing device of a motor. In FIG. 12, shaft 104 fixed to rotor 108 is rotatably supported with oil impregnated sintered bearing 103. A first end of bearing boss 102 which firmly holds bearing 103 is sealed with cap 109 to prevent lubricant 115 from leaking. At a second end (open end) of boss 102, oil shield washer 105 is provided, grooves are formed on an outer wall of bearing 103, and grooves are formed on bearing boss 102. This structure prevents lubricant 115 from leaking out to outside of the bearing device. Stopper 106 is rigidly mounted to shaft 104 to prevent shaft 104 from coming off. Between stopper 106 and a lower end of bearing 103, thrust plate 107 is prepared.

In the foregoing structure, however, the motor is forced to increase its rpm due to speeding up and sophistication of the apparatus, so that the temperature of the bearing rises due to the lubricant's viscous heat as well as an increase in the load in the radial direction due to an imbalance of the rotor. As a result, the foregoing structure cannot extend the motor's life or even maintain the present rated life.

A service life of a bearing is determined by the factors such as degradation or consumption of lubricant impregnated in the oil impregnated sintered bearing, or wear of a sliding face of the bearing. In the foregoing conventional bearing device, the first end of the bearing is completely sealed with the cap, and lubricant leaks out from the oil impregnated sintered bearing due to temperature rise or vibration during the operation and pools in the cap. The lubricant pooled cannot return into the bearing, so that the amount of the lubricant in the bearing eventually decreases. The sliding face of the shaft thus cannot be protected with sufficient lubricant. This is the same phenomenon as occurs when the lubricant is consumed. As a result, the service life of the bearing device is shortened.

DISCLOSURE OF THE INVENTION

The present invention addresses the problem discussed above, and aims to provide a bearing device that can supply lubricant within the device effectively to the sliding face of a shaft, thereby extending a service life of the bearing device.

The bearing device of the present invention comprises the following elements:

- an oil impregnated sintered bearing rotatably supporting a shaft rigidly mounted to a rotor;
- a bearing boss firmly holding the bearing with an inner wall of the bearing boss; and
- a cap for sealing an end of the bearing boss.

A plurality of grooves are formed on the inner wall of the cap for retaining the lubricant leaking out from the bearing and for returning the lubricant to the bearing. This structure allows stable supply of lubricant to the sliding face of the shaft, so that the service life of the bearing is extended.

BRIEF DESCRIPTION OF THE DRAWINGS

FIG. 12 shows a sectional view of a conventional motor.

EXEMPLARY EMBODIMENTS OF THE INVENTION

Exemplary embodiments of the present invention are demonstrated hereinafter with reference to the accompanying drawings.

First Exemplary Embodiment

Figure 1:
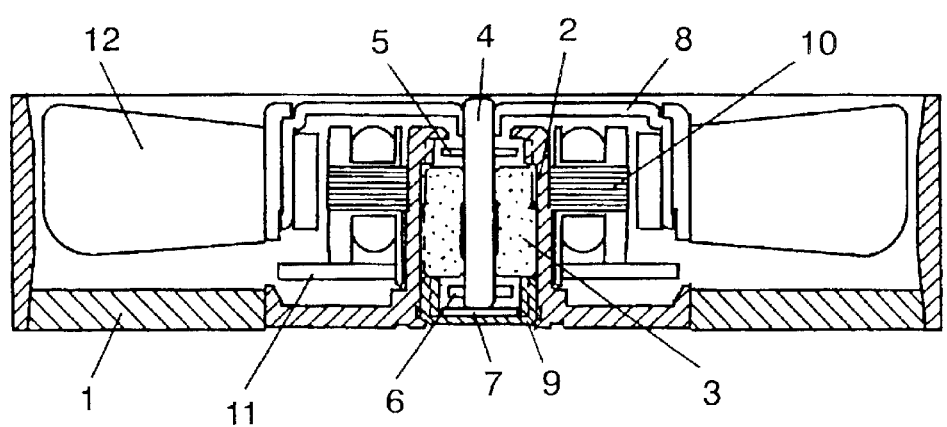
FIG. 1 shows a sectional view illustrating a structure of a fan motor equipped with a bearing device in accordance with a first exemplary embodiment of the present invention.
Figure 2:
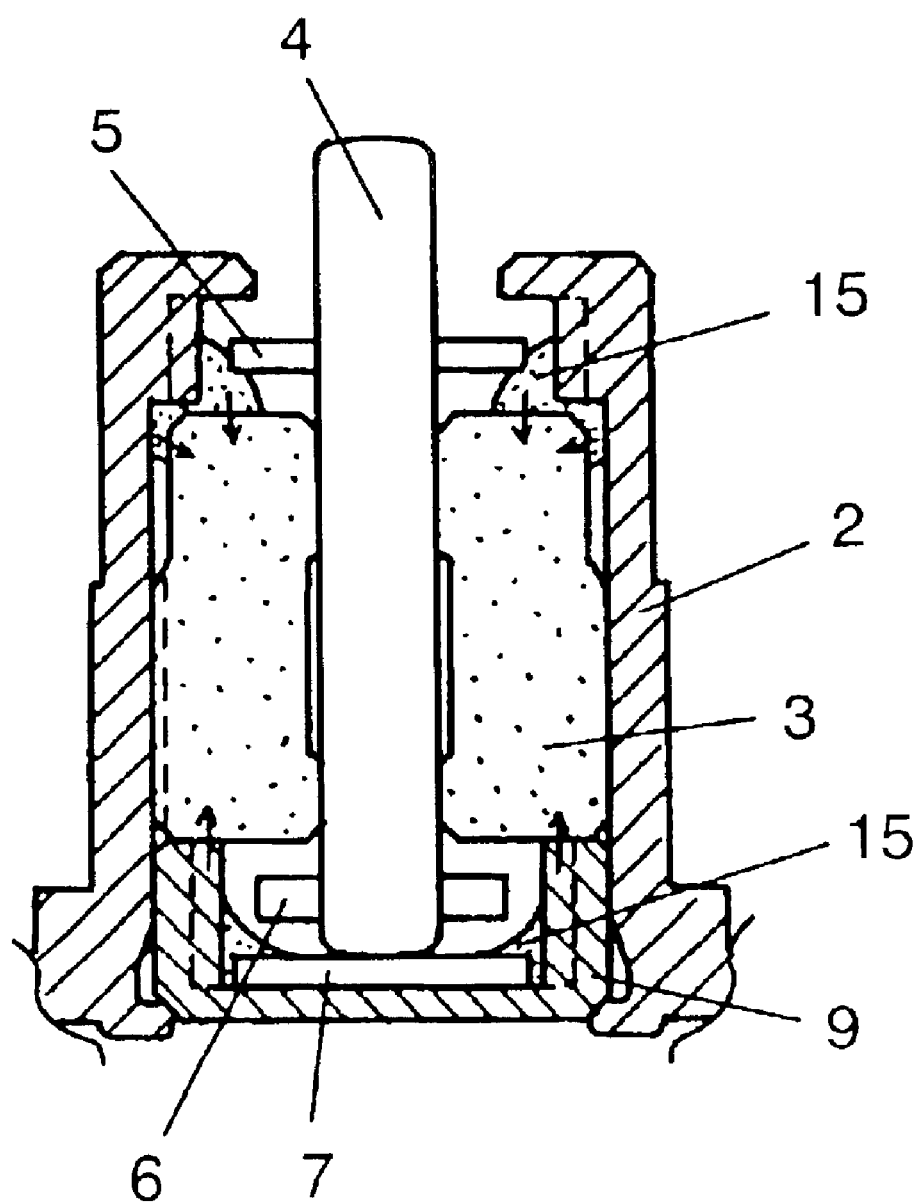
FIG. 2 shows a detailed sectional view of the bearing device shown in FIG. 1.
Figure 3:
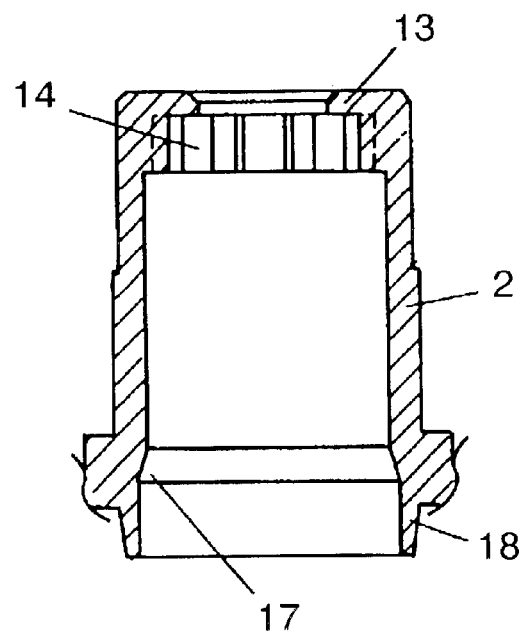
FIG. 3 shows a sectional view of a bearing boss of the bearing device shown in FIG. 2.
Figure 4:
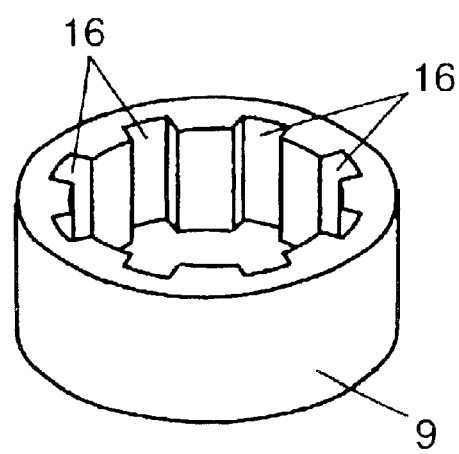
FIG. 4 shows a perspective view of a cap of the bearing device shown in FIG. 2.
Figure 5:
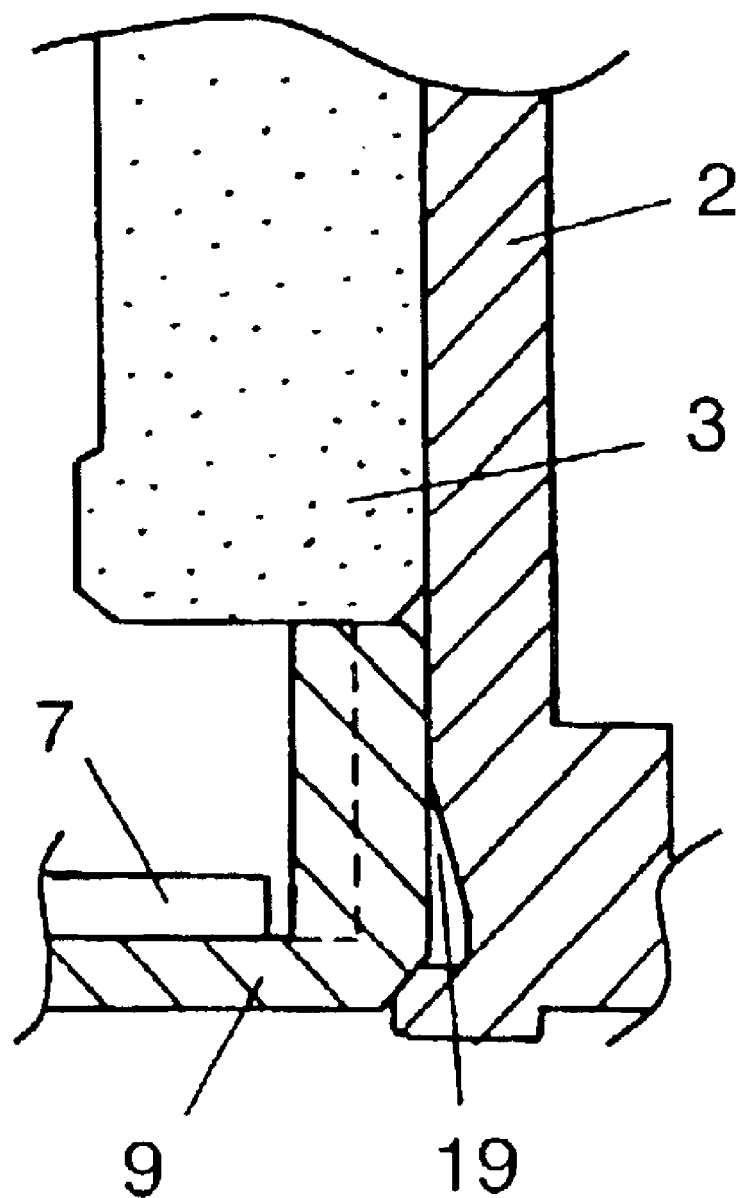
FIG. 5 shows a detailed sectional view illustrating a vicinity of the cap of the bearing device shown in FIG. 2.

FIG. 1 shows a sectional view illustrating a structure of a fan motor equipped with a bearing device in accordance with the first exemplary embodiment of the present invention. FIG. 2 shows a detailed sectional view of the bearing device of the first embodiment. FIG. 3 shows a sectional view of a bearing boss of the bearing device shown in FIG. 2. FIG. 4 shows a perspective view of a cap of the bearing device. FIG. 5 shows a detailed sectional view illustrating a vicinity of the cap of the bearing device.

FIG. 1 shows a structure of a fan motor for cooling an apparatus. In FIG. 1, housing 1, an external member of the motor, and bearing boss 2 are unitarily molded with resin. The stator of the motor is fixed to boss 2. The bearing device is constructed in the following way: Oil impregnated sintered bearing 3 is press-fitted into the inner wall of boss 2. Shaft 4 fixed to rotor 8 is inserted into bearing 3, which rotatably supports shaft 4. Oil shield washer 5 made from resin is press-fitted on the upper section of shaft 4, and stopper 6 made from metal is press-fitted on the lower section of shaft 4. The lower end of shaft 4 contacts with thrust plate 7 made from anti-abrasion resin. Thrust plate 7 is fixed with cap 9 molded with the same resin as used in housing 1, and bears the thrust load of rotor 8.

On the outer wall of bearing boss 2, stator 10 on which coils are wound and printed circuit board 11 to which a driving circuit is provided are rigidly mounted. On the outer wall of rotor 8, fan 12 is rigidly mounted. On the inner wall of rotor 8, magnets are fixed. The magnets are opposite to stator 10 via an annular space. The coils are powered from outside of the motor via circuit board 11, so that rotating torque is generated between the magnets of rotor 8 and stator 10. This torque rotates fan 12 to create wind.

Next, the bearing device in accordance with the first embodiment is further detailed with reference to FIG. 2 and FIG. 3, which show a structure of bearing boss 2 as follows: A first end of boss 2 is sealed with cap 9 and a second end thereof is open. The upper end 13 (open side) of boss 2 has a smaller diameter than the outer diameter of bearing 3. A plurality of grooves 14 are formed axially on the inner wall of boss 2 from its upper end 13 to just above bearing 3. The inner diameter of bearing 3 is greater at the intermediate portion than that of other portions, i.e. bearing 3 is an oil impregnated sintered bearing and has a middle-escaping structure. The outer diameter of the upper portion of bearing 3 is smaller than that of other portions.

The bearing device discussed above works in the following way: Rotation of shaft 4 causes a part of lubricant 15, which oozes because of pressure increase due to temperature rise or vibrations, to leak toward the rotor by travelling on shaft 4. In this case, the structure employed in the first embodiment prevents lubricant 15 from leaking to outside. To be more specific, when lubricant 15 leaking and travelling on shaft 4 arrives at oil shield washer 5, centrifugal force blows lubricant 15 away. Then lubricant 15 attaches to the upper portion of bearing boss 2, where grooves 14 are formed. Grooves 14 retain lubricant 15 using the surface tension of the lubricant and prevent lubricant 15 from leaking to outside. Lubricant 15 retained in grooves 14 travels through a space between bearing 3 and boss 2 due to a capillary phenomenon, then arrives at the upper end of bearing 3. Finally lubricant 15 is absorbed into bearing 3 again.

In the lower portion of the bearing device, metallic stopper 6 is press-fitted to the lower section of shaft 4 in order to prevent rotor 8 from coming off. The lower end of shaft 4 forms like an arc, and the tip of the arc contacts with thrust plate 7, made from anti-abrasion resin, almost in a point contact status. Sliding in such a nearly point-contact status reduces contacting area, so that very small torque can rotate shaft 4. This structure is thus effective to reduce the power consumption of the motor. However, a large pressure is applied to thrust plate 7, therefore, a selection of the material of thrust plate 7 is critical. To be more specific, PET (polyethylene terephthalate) with filler, PEEK (polyetherethreketone), or PI(polyimide) are excellent in anti abrasion characteristics and effective for this application.

Thrust plate 4 is held with cap 9 molded with the same resin as bearing boss 2. On the inner wall of cap 9, grooves 16 are provided as shown in FIG. 4, and grooves 16 retain lubricant 15 leaked out from bearing 3. Further, cap 9 and bearing 3 are mounted such that they contact with each other or they are close to each other, whereby the lubricant retained in grooves 16 is supplied to bearing 3 using a capillary phenomenon. Therefore, lubricant 15 does not pool at this space unlike a conventional one, and the lubricant within the bearing device can be efficiently used. As a result, the life of the bearing can be extended.

Cap 9 is rigidly mounted in the following way: As shown in FIG. 3, bearing boss 2, to which cap 9 is inserted, has flare section 17, where the inner diameter gradually becomes greater, and annular collar section 18.

FIG. 5 details cap 9 after the motor is assembled. Cap 9 is kept in contact with bearing 3, then collar section 18 is pressed with a heated jig, so that collar section 18 is welded and cap 9 is fixed to bearing boss 2. At this time, if cap 9 solidly contacts with bearing boss 2, the lubricant will not leak to the outside; however, it is practically impossible to realize the complete solid contact. Therefore, in this first embodiment, the following idea is adopted to prevent lubricant 15 from leaking outward using the properties of fluid even if the solid contact cannot be realized.

In FIG. 5, flare section 17 provided to bearing boss 2 forms enlarging space 19 between the outer wall of cap 9 and the inner wall of boss 2, and space 19 enlarges gradually as the distance from bearing 3 increases. The fluid has a property of reducing its surface area as small as possible due to the surface tension. Thus, if lubricant 15 leaks to this enlarging space 19, the surface tension produces force that pushes back lubricant 15 toward bearing 3, and lubricant 15 scarcely leaks out. In other words, the foregoing structure works as a surface tension seal.

To maximize the performance of this surface tension seal, boss 2 and cap 9 are preferably made from the same material, or the surfaces of both boss 2 and cap 9 are coated with the same material, so that affinities of both of the surfaces and that of lubricant 15 can be matched. If the affinities between both of boss 2, cap 9 and lubricant 15 are extraordinarily different from each other, the sealing effect sometimes does not work well.

In the foregoing description, flare section 17 is provided to the inner wall of boss 2; however, the flare section can be prepared on the outer wall of cap 9. This structure produces, not to mention, a similar advantage to what is discussed above.

In this first embodiment, the structure discussed above allows lubricant 15 once leaked out from bearing 3 to return into bearing 3. Thus the lubricant can be supplied well to the sliding face of shaft 4. Since this structure prevents the lubricant from leaking to the outside, the life of the bearing device can be extended.

In this first embodiment, bearing boss 2 and cap 9 are fixed to each other by heat welding; however, other methods such as ultrasonic welding, press-fitting or bonding can produce a similar advantage. In the case of ultrasonic welding, a jig in small oscillation is applied to the resin to melt locally with frictional heat between the jig and the resin. In the case of press-fitting, cap 9 is sometimes deformed which degrades the perpendicularity of thrust plate 7 with respect to shaft 4, and in the case of bonding, the adhesive sometimes chemically reacts with the lubricant to degrade the lubricant. Thus the heat welding or the ultrasonic welding is preferable for this structure.

Second Exemplary Embodiment

Figure 6:
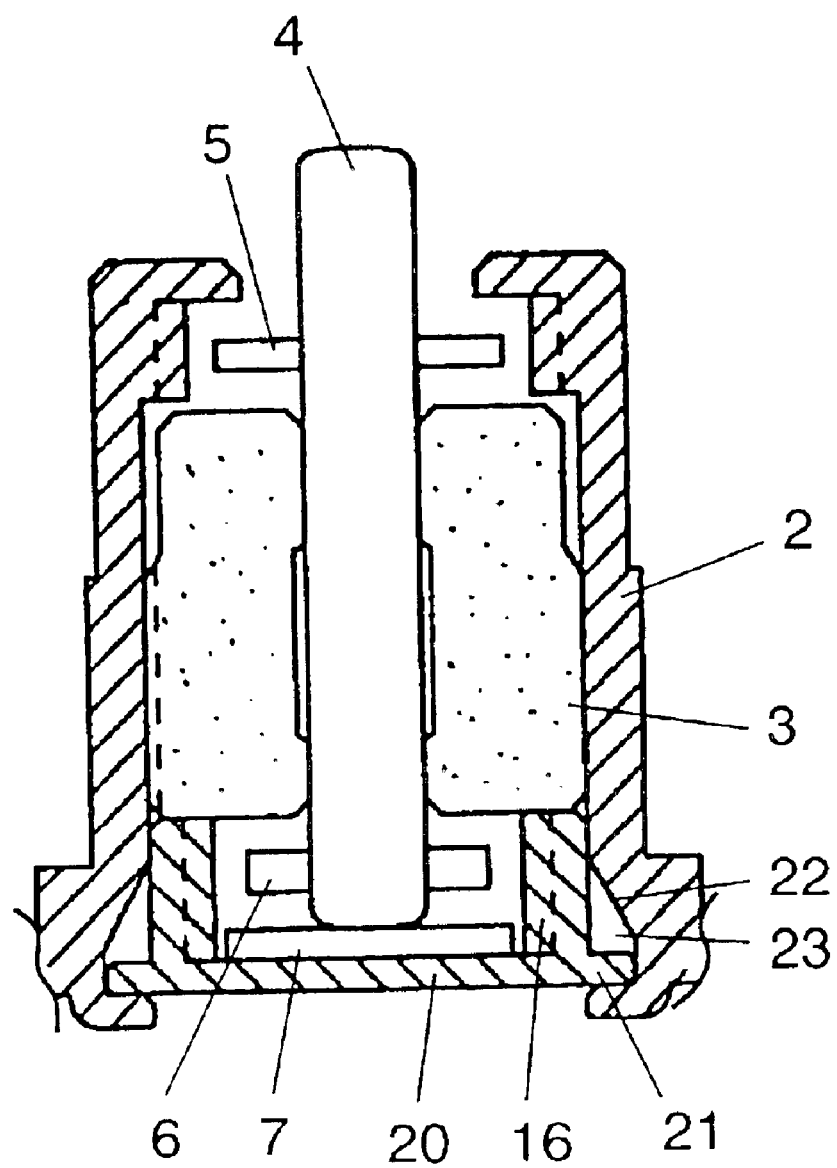
FIG. 6 shows a detailed sectional view of a bearing device in accordance with a second exemplary embodiment.
Figure 7:
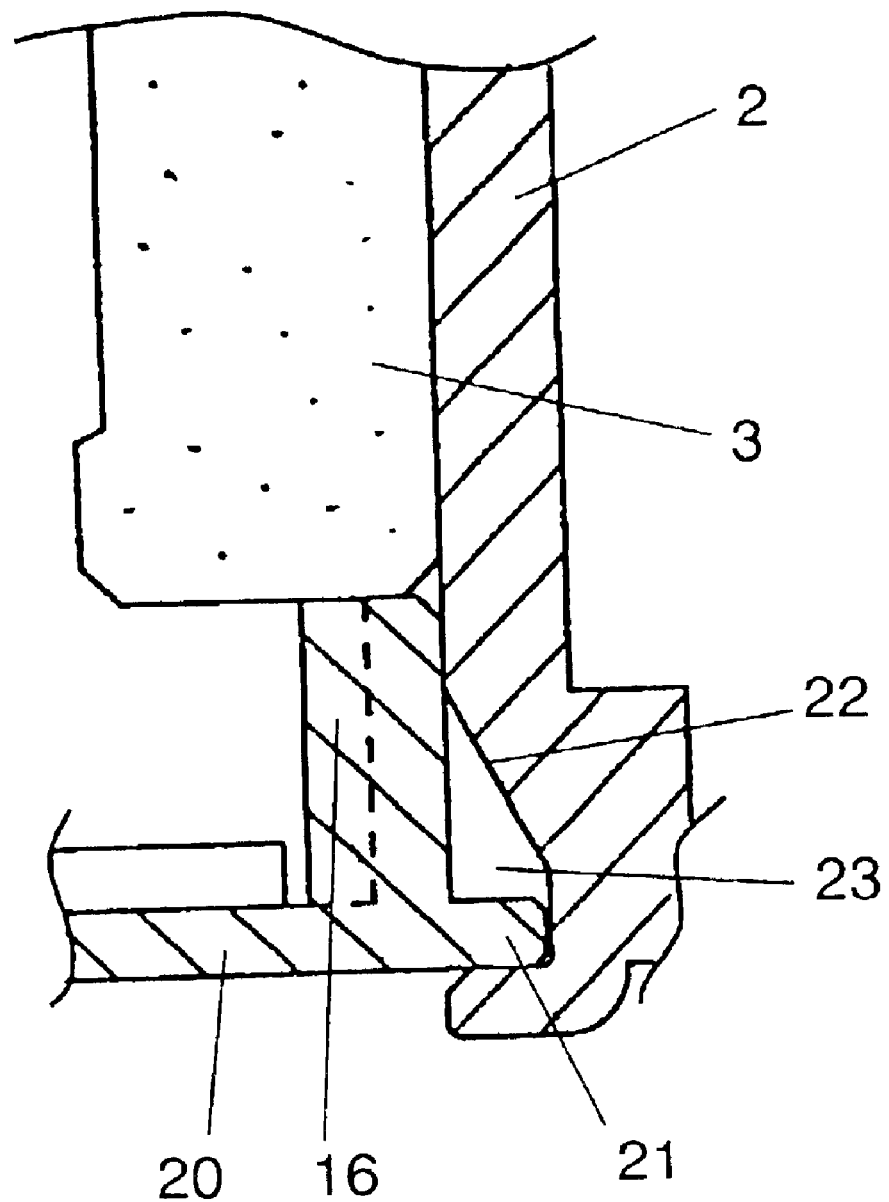
FIG. 7 shows a detailed sectional view illustrating a vicinity of the cap of the bearing device shown in FIG. 6.

FIG. 6 shows a detailed sectional view of a bearing device in accordance with the second exemplary embodiment. FIG. 7 shows a detailed sectional view illustrating a vicinity of the cap of the bearing device shown in FIG. 6.

In the second embodiment, the lubricant sealing mechanism and the retaining mechanism of the cap are further improved. In the previous first embodiment, cylindrical cap 9 is used; however, as shown in FIG. 6 and FIG. 7, cap 20 in accordance with the second embodiment has brim 21 at the lower section, and brim 21 has a greater outer diameter than that of other parts of cap 20. The outer wall of cap 20 is fixed to the inner wall of bearing boss 2. Flare section 22 of boss 2 has a greater flaring angle than that in the first embodiment, so that space 23 formed between cap 20 and boss 2 is greater than enlarging space 19 in the first embodiment.

Other structural points such as grooves 16 being provided on the inner wall of cap 20 for restoring the lubricant, and cap 20 being fixed at its brim by heat welding, are similar to those in the first embodiment.

Brim 21 provided to cap 20 reduces a gap (or increases adhesion) between cap 20 and the welded section when cap 20 is fixed to boss 2 at the brim by heat welding. Therefore, if force is applied in the removal direction of cap 20, stress to the welded section is smaller than in the first embodiment. As a result, higher strength of the structure can be obtained than in the first embodiment.

Since space 23 is greater than space 19 of the first embodiment, the surface tension of the lubricant in space 23 is stronger, which can further restrain the lubricant from leaking. Since space 23 has a larger capacity, if the lubricant leaks to space 23 due to vibrations or shocks, the lubricant is once pooled in space 23 before being pushed back into the bearing. In other words, this structure further prevents the lubricant from leaking to the outside.

As discussed above, the second embodiment can provide a high-performance motor that is stronger in structure and has less possibility of lubricant leakage than the first embodiment. And yet, this high-performance motor can be manufactured with the same number of parts and the same manufacturing method as the first embodiment although the shape of cap 20 is rather more complicated than that of the first embodiment.

Third Exemplary Embodiment

Figure 8:
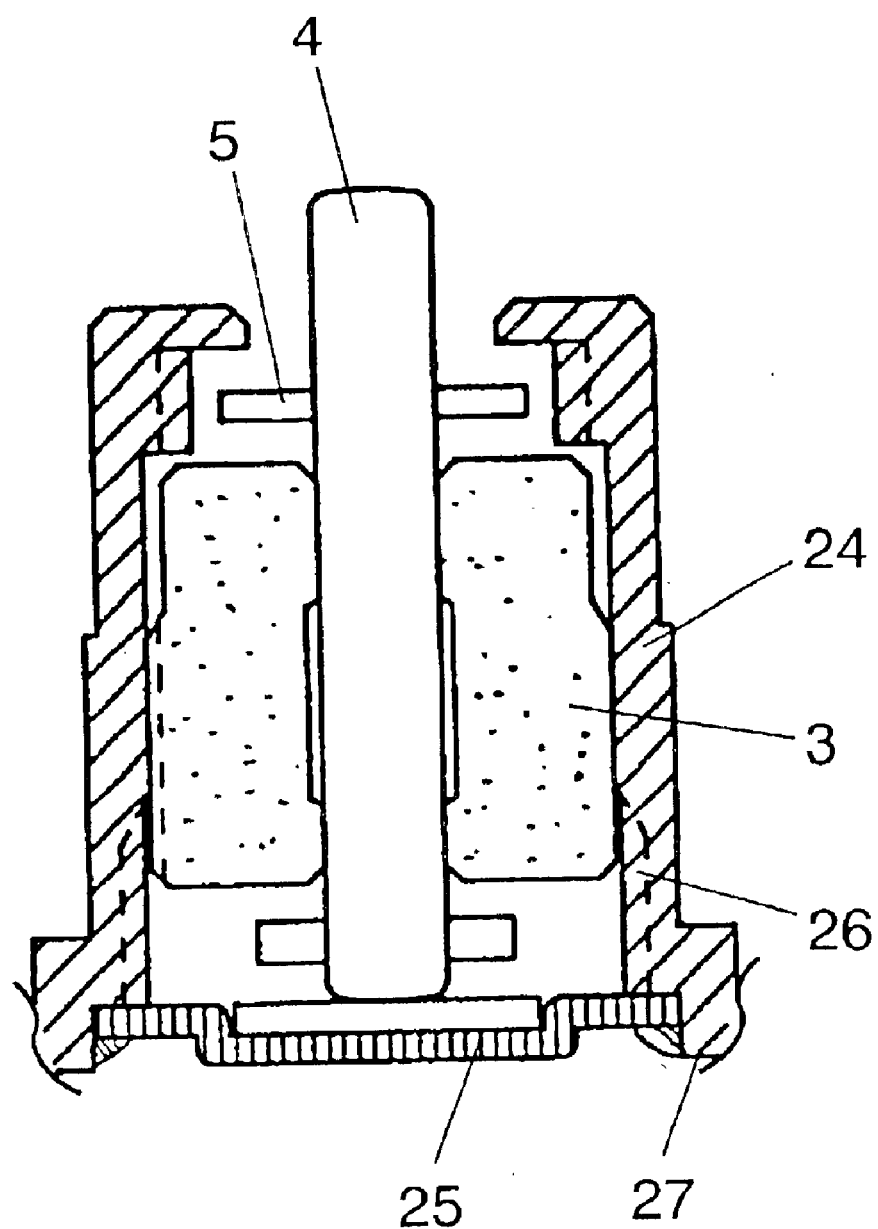
FIG. 8 shows a detailed sectional view of a bearing device in accordance with a third exemplary embodiment.
Figure 9:
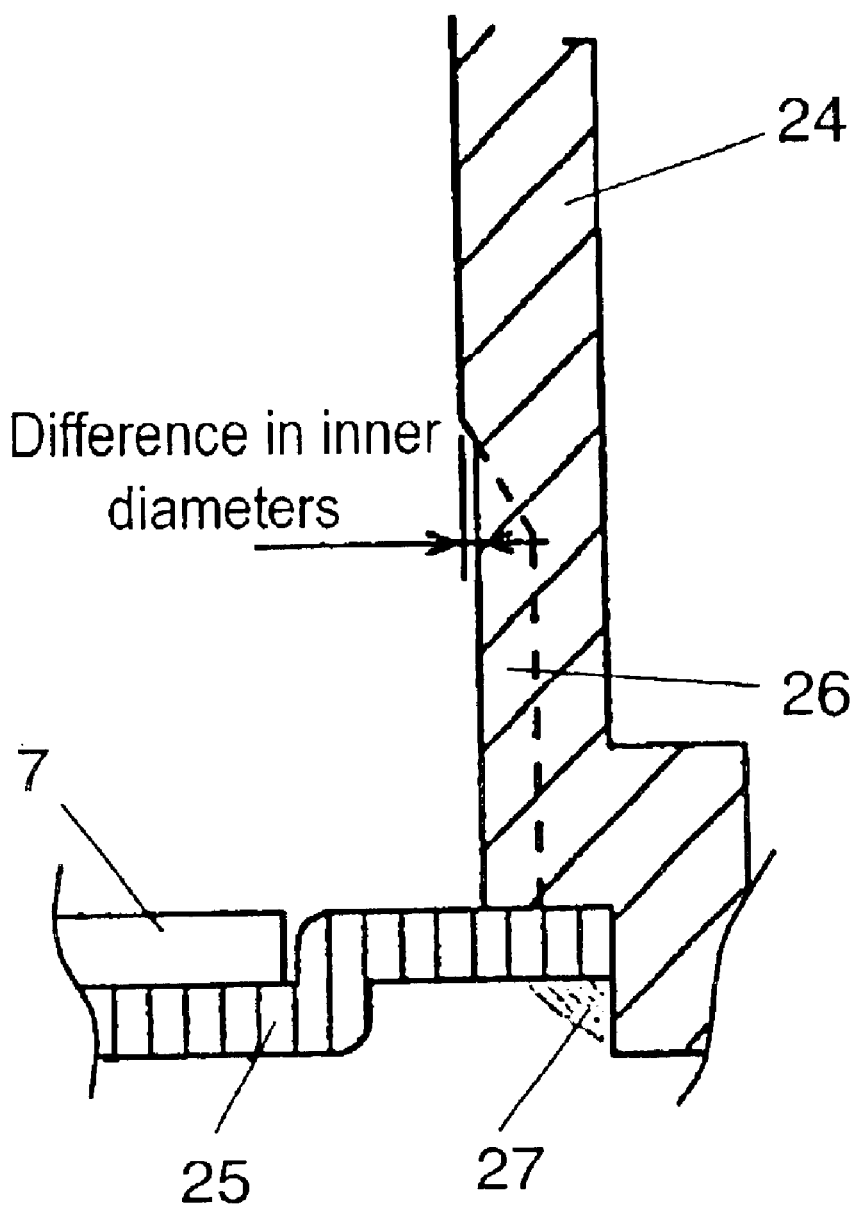
FIG. 9 shows a detailed sectional view illustrating a vicinity of the cap of the bearing device shown in FIG. 8.

FIG. 8 shows a detailed sectional view of a bearing device in accordance with the third exemplary embodiment. FIG. 9 shows a detailed sectional view illustrating a vicinity of the cap of the bearing device shown in FIG. 8.

In this third embodiment, a first end of bearing boss 24 is fixed by cap 25 in a similar manner to the first and the second embodiments. However, cap 25 in this third embodiment is shaped like a simple disc, and does not have grooves for restoring lubricant. A plurality of grooves 26 are formed, instead, on the inner wall of bearing boss 24 at the cap side.

In the first and second embodiments, the cap is made from the same resin as that of the housing; however, cap 25 in the third embodiment is made by pressing a plated steel plate. In general, metal stamping can form products at a higher speed and at a lower cost than injection molding of resin although the stamping can only handle simple shapes. Cap 25 in the third embodiment is thus less expensive than those in the first and second embodiments.

In FIG. 9, bearing boss 24 is equipped with a step by molding on the inner wall at its lower portion. Cap 25 is press fitted into the lower portion (having a larger diameter) of bearing boss 24, and the outer wall of cap 25 is sealed by adhesive 27 to prevent the lubricant from leaking. This structure makes cap 25 be subjected to strong stress, and cap 25 thus tends to be deformed. Therefore, cap 25 is made of plated steel plate that is stronger than resin. This structure restrains cap 25 from being deformed.

Grooves 26, for retaining and restoring the lubricant, are formed on the inner wall of bearing boss 24 at a smaller diameter side and extend until the section overlaps with the lower section of bearing 3. Overlapping grooves 26 with bearing 3 makes these two elements face each other in a wider area, so that the lubricant can be restored smoothly.

Grooves 26 become shallower as they approach the bearing, and the inner diameter of the grooved wall is slightly greater by several to several tens of $\mu$m than that of the inner wall where bearing 3 is fixed.

The difference in two inner diameters, i.e., an inner diameter of the section where a depth of grooves 26 varies and an inner diameter of the inner wall where bearing 3 is fixed or held by the peaks of grooves 26, allows placing inner diameter pins of the metal die with ease when the die is produced. The difference also improves releasing of the product from the die. The shallower sections of the grooves produce force that pushes back the lubricant into bearing 3 due to the surface tension, so that grooves 26 increase their restoring effect of the lubricant. The difference in the inner diameters at the inner wall of bearing boss 25 guides bearing 3 to be press-fitted into boss 24, so that the outer wall of bearing 3 and the inner wall of boss 24 are protected against scratches and bearing 3 is prevented from slanting.

Further, as shown in FIG. 8, bearing 3 is firmly held using only its outer wall in part where escape is provided at its inner wall, so that holding strength of bearing 3 weakens; however, this structure restrains the contraction of the inner diameter of the bearing at press-fitting into boss 24. Thus the accuracy of the inner diameter of bearing 3 increases.

The advantages discussed above allow the third embodiment to provide a long-life motor similar to the first and second embodiments.

Fourth Exemplary Embodiment

Figure 10:
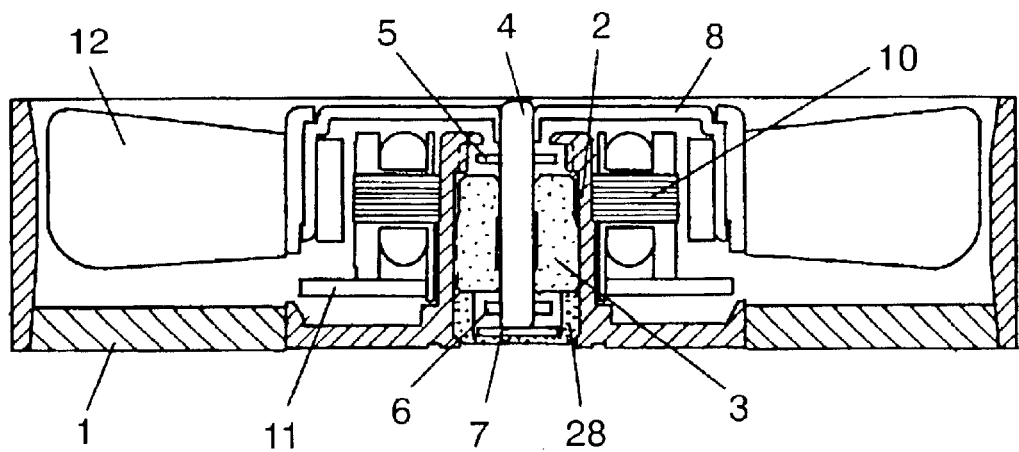
FIG. 10 shows a sectional view illustrating a structure of a fan motor equipped with a bearing device in accordance with a fourth exemplary embodiment of the present invention.
Figure 11:
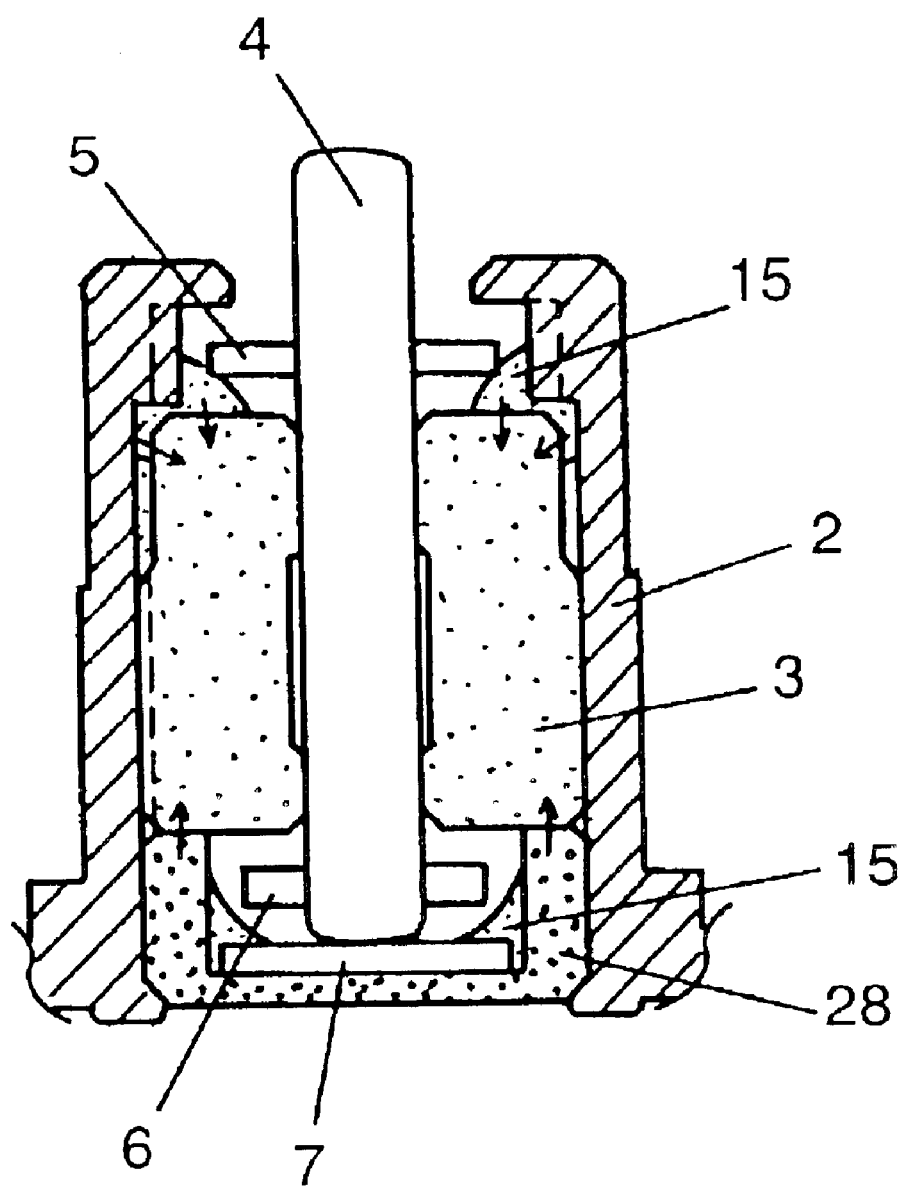
FIG. 11 shows a detailed sectional view of the bearing device in accordance with the fourth exemplary embodiment.

FIG. 10 shows a sectional view illustrating a structure of a fan motor equipped with a bearing device in accordance with the fourth exemplary embodiment of the present invention. FIG. 11 shows a detailed sectional view of the bearing device in accordance with the fourth exemplary embodiment.

The fourth embodiment provides a different structure from those of the previous embodiments, and it can produce similar advantages or more than similar advantages than those of the previous embodiments.

A structure of the fan motor in accordance with the fourth embodiment is almost the same as that shown in FIG. 1 of the first embodiment. The only difference is a construction around cap 28. To be more specific, cap 9 in accordance with the first embodiment is made from the same resin as bearing boss 2; however, cap 28 used in the fourth embodiment is made from porous sintered alloy. The flare section formed at the bearing boss is eliminated in the fourth embodiment.

In this fourth embodiment, the sintered alloy cap 28 has intentionally a greater hole diameter than that of the sintered alloy used in oil impregnated sintered bearing 3. When cap 28 is brought into contact with bearing 3, this difference in hole diameters can supply lubricant 15, soaking into cap 28 due to a capillary phenomenon, to bearing 3.

This structure absorbs lubricant 15, leaked not only to the inner wall of cap 28 but also to the bottom of cap 28 and the outer wall contacting with bearing boss 2, without any loss and returns it to bearing 3. As a result, the life of the bearing can be further extended. Cap 28 can soak up in advance the same lubricant as the oil that is impregnated into sintered bearing, so that a total amount of the lubricant in the whole bearing device increases, which further extends the bearing life. A void content of the oil impregnated sintered bearing is set, in general, at a value ranging from 10 vol % to 30 vol %. This value does not adversely affect the supply of lubricant to the sliding face or an oil film pressure of the shaft sliding face. The material of cap 28 in the fourth embodiment preferably has a volume void content as large as possible unless the strength or oil retaining ability of cap 28 is adversely affected. A greater void content can increase the amount of the lubricant, so that the bearing life can be further extended.

In the foregoing description, cap 28 made from porous sintered alloy is taken as an example; however, other porous materials such as porous resin can produce a similar advantage.

Although the previous embodiments show that the bearing stands vertically, the lubricant restoration to the sliding face of the bearing due to the capillary phenomenon, or the sealing effect due to the surface tension of the lubricant can be produced regardless of an orientation of the bearing. The previous embodiments use a fan motor as an example; however, other motors using similar bearing devices can extend their service lives.

INDUSTRIAL APPLICABILITY

A bearing device includes an oil impregnated sintered bearing that rotatably holds a shaft fixed to a rotor, a bearing boss which firmly holds the bearing with its inner wall, and a cap that seals an end of the boss. A plurality of grooves are formed on the inner wall of the cap, so that lubricant leaked out from the bearing is retained therein and returned to the bearing. This bearing device can be used in miniature motors employed in OA apparatuses or AV apparatuses and extend the life of the bearing.

What is claimed is:

1. A bearing device comprising:
   an oil impregnated sintered bearing that rotatably holds a shaft fixed to a rotor;
   a bearing boss firmly holding the bearing with inner wall thereof; and
   a cap for sealing one end of the bearing boss,
   wherein a plurality of grooves are formed on inner wall of the cap for retaining lubricant leaked out from the bearing and for restoring the lubricant to the bearing.

2. The bearing device of claim 1, wherein at least one of a part of the boss and a part of the cap forms a flare section, so that a space is provided between the boss and the cap, and the space enlarges as a distance from the bearing increases.

3. The bearing device of claim 1, wherein the cap and the bearing boss are made from an identical material.

4. The bearing device of claim 1, wherein the cap and the inner wall of the bearing boss are coated with an identical material.

5. The bearing device of claim 1, wherein a part of inner wall of the bearing boss forms a flare section and a brim is formed on outer wall of the cap, so that a space is provided between the bearing boss and the cap, and the space enlarges as a distance from the bearing increases.

6. The bearing device of claim 1, wherein the cap is brought into contact with the bearing.

7. A bearing device comprising:
   an oil impregnated sintered bearing that rotatably holds a shaft fixed to a rotor;
   a bearing boss firmly holding the bearing with inner wall thereof; and
   a cap for sealing one end of the bearing boss,
   wherein a plurality of grooves are formed on inner wall of the bearing boss at the cap side for retaining lubricant leaked out from the bearing and for restoring the lubricant to the bearing.

8. The bearing device of claim 7, wherein a section of the grooves becomes shallower closer to the bearing.

9. The bearing device of claim 7, wherein the grooves axially overlap with a lower section of the bearing.

10. The bearing device of claim 7, wherein an inner diameter at a section, where the grooves are formed, of the bearing boss is slightly greater than the inner diameter at a section, where the bearing is firmly held, of the bearing boss.

11. The bearing device of claim 7, wherein the cap is brought into contact with the bearing.

12. A bearing device comprising:
   an oil impregnated sintered bearing that rotatable holds a shaft fixed to a rotor;
   a bearing boss firmly holding the bearing with inner wall thereof; and
   a cap for sealing one end of the bearing boss,
   wherein the cap is made of porous material for retaining lubricant leaked out from the bearing and for restoring the lubricant to the bearing, and
   wherein a hole diameter of the porous material is greater than that of material of the bearing.

13. A motor comprising:
   a bearing device including;
   an oil impregnated sintered bearing that rotatably holds a shaft fixed to a rotor;
   a bearing boss firmly holding the bearing with inner wall thereof; and
   a cap for sealing one end of the bearing boss,
   wherein a plurality of grooves are formed on inner wall of the cap for retaining lubricant leaked out from the bearing and for restoring the lubricant to the bearing.

14. A motor comprising:
   a bearing device including;
   an oil impregnated sintered bearing that rotatably holds a shaft fixed to a rotor;
   a bearing boss firmly holding the bearing with inner wall thereof; and
   a cap for sealing one end of the bearing boss,
   wherein a plurality of grooves are formed on inner wall of the bearing boss at the cap side for retaining lubricant leaked out from the bearing and for restoring the lubricant to the bearing.

* * * * *

UNITED STATES PATENT AND TRADEMARK OFFICE
CERTIFICATE OF CORRECTION

| | | |
|---|---|---|
| PATENT NO. | : 6,832,853 B2 | Page 1 of 1 |
| APPLICATION NO. | : 10/296376 | |
| DATED | : December 21, 2004 | |
| INVENTOR(S) | : Hiroyasu Fujinaka | |

It is certified that error appears in the above-identified patent and that said Letters Patent is hereby corrected as shown below:

In column 8, claim 12, line 2, "rotatable" should read --rotatably--.

Signed and Sealed this

Twenty-seventh Day of February, 2007

JON W. DUDAS
*Director of the United States Patent and Trademark Office*